(12) United States Patent
Downey

(10) Patent No.: US 6,254,188 B1
(45) Date of Patent: Jul. 3, 2001

(54) SEAT TRACK WITH CAM ACTUATED LOCKING DEVICE

(75) Inventor: Hugh D. Downey, Barrie (CA)

(73) Assignee: Dura Automotive Properties, Inc., Rochester Hills, MI (US)

( * ) Notice: Subject to any disclaimer, the term of this patent is extended or adjusted under 35 U.S.C. 154(b) by 0 days.

(21) Appl. No.: 09/086,834

(22) Filed: May 29, 1998

(51) Int. Cl.$^7$ ...................................................... B60N 2/08
(52) U.S. Cl. ........................................... 297/341; 248/430
(58) Field of Search ............................. 297/341; 248/429, 248/430

(56) References Cited

U.S. PATENT DOCUMENTS

| | | | |
|---|---|---|---|
| 3,981,473 | * | 9/1976 | Nagal ................................. 297/341 X |
| 4,455,009 | * | 6/1984 | Foster et al. ......................... 297/341 |
| 4,621,867 | * | 11/1986 | Perring et al. ....................... 297/341 |
| 4,639,038 | * | 1/1987 | Heling ................................. 297/341 |
| 4,666,208 | * | 5/1987 | Tatematsu et al. ................... 297/341 |
| 4,671,571 | * | 6/1987 | Gionet ................................. 297/341 |
| 5,052,751 | * | 10/1991 | Hayakawa et al. .................. 297/341 |
| 5,597,206 | * | 1/1997 | Ainsworth et al. ............... 297/341 X |
| 5,688,026 | * | 11/1997 | Reubeuze et al. ................... 297/341 |

* cited by examiner

Primary Examiner—Peter R. Brown
(74) Attorney, Agent, or Firm—Robert K. Roth

(57) ABSTRACT

A vehicle seat assembly includes a seat back pivotally supported with respect to a seat bottom and is attached to the vehicle by a mounting assembly. The mounting assembly includes a locking device mounted on an upper track that moves relative to a lower track. The locking device includes at least one locking tooth that engages one or more slots on the lower track so that the upper track and the seat are maintained in a fixed position relative to the lower track. The locking device includes a first release member for disengaging the locking device and adjusting the position of the seat. The locking device also includes a second release member which is responsive to pivotal movement of the seat back with respect to the seat bottom or is responsive to some other type of actuation member. As the seat back is pivoted toward the seat bottom, the second release member rotates with respect to the upper track and engages the locking device causing it to move from a locked position to an unlocked position. This causes the upper track and the seat to move with respect to the lower track.

19 Claims, 4 Drawing Sheets

SEAT TRACK WITH CAM ACTUATED LOCKING DEVICE

BACKGROUND OF THE INVENTION

This application relates generally to an assembly for mounting a seat within a vehicle. More particularly, this invention relates to a seat mounting assembly with a locking device that is laterally engaged by a release member to move the locking device between a locked position and an unlocked position.

Seat track arrangements for mounting seats within vehicles are generally well known. Most arrangements provide for a seat to be moved or adjusted in forward and rearward directions within a vehicle.

In many circumstances, it is desirable to have seats within a vehicle that include a seat back that is pivotally supported on a seat bottom such that the seat back can be folded forward and downward relative to the seat bottom. Such an arrangement is necessary, for example, in two-door vehicles so that a passenger can have access into and out of the rear seat of the vehicle. It is also desirable that a front seat in a two-door vehicle slide forward to allow easier access to the rear seat of the vehicle.

Mounting assemblies that are used to mount the seat to the vehicle are often complex, especially when the mounting assembly includes the dual capability of being able to adjust the seat in forward and rearward directions and being able to slide the seat forward when the seat back is pivoted toward the seat bottom. These complex mounting assemblies require a great number of components which increases the assembly time and the overall cost of the seat assembly.

Accordingly, it is desirable to provide a simplified and inexpensive seat mounting assembly that includes rearward and forward seat adjustment capability and seat sliding capability when the seat back is pivoted downwardly. It is also desirable for the mounting assembly to be durable, easy to operate, and quiet.

SUMMARY OF THE INVENTION

In general terms, this invention is a vehicle seat assembly with a seat back pivotally supported with respect to a seat bottom, and which is attached to the vehicle by a mounting assembly. A first track is attached to the vehicle and a second track is supported on the second track such that the second track can move forwardly and rearwardly with respect to the first track. The mounting assembly includes a locking device mounted on the second track that moves relative to the first track. The locking device includes one or more locking teeth that engage one or more slots on the first track so that the second track and the seat are maintained in a fixed position relative to the first track. The locking device includes a release member for disengaging the locking device and adjusting the position of the seat.

In a preferred embodiment of this invention, the assembly for mounting a seat within a vehicle includes a first track, a second track supported for movement relative to the first track, and a locking device supported on the second track and moveable between a locked position and an unlocked position. In the locked position the locking device maintains the second track in a desired position while in the unlocked position the second track is movable relative to the first track. The assembly further includes a release member that selectively moves into a release position to move the locking device out of the locked position and maintain the locking device in the unlocked position such that the second track can move relative to the first track. The release member includes an engaging portion that slidably engages the locking device and moves it between the locked and unlocked positions.

The subject invention offers several advantages over prior art systems because it provides a simplified mounting for a seat within a vehicle that is durable, easy to assemble, and quiet in operation.

These and other features and advantages of the present invention will be best understood from the following specification and drawings, the following of which is a brief description.

DETAILED DESCRIPTION OF THE PREFERRED EMBODIMENT

Figure 1:
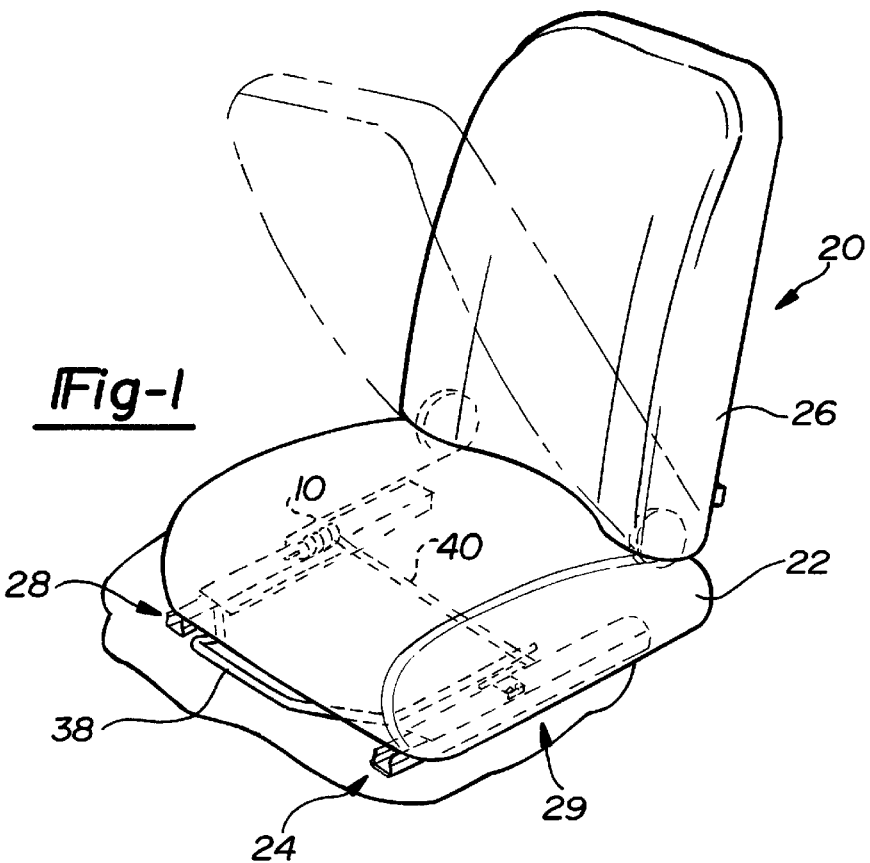
FIG. 1 is a perspective illustration of a seat with a seat track mounting assembly designed according to this invention.

FIG. 1 illustrates a vehicle seat assembly 20. The seat assembly 20 includes a seat bottom 22 that is mounted within the vehicle on a mounting assembly 24. A seat back 26 is pivotally supported for pivotal movement relative to the seat bottom 22 as indicated in phantom in FIG. 1. A cable 10 operably connects the seat back 26 to the mounting assembly 24.

Figure 2:
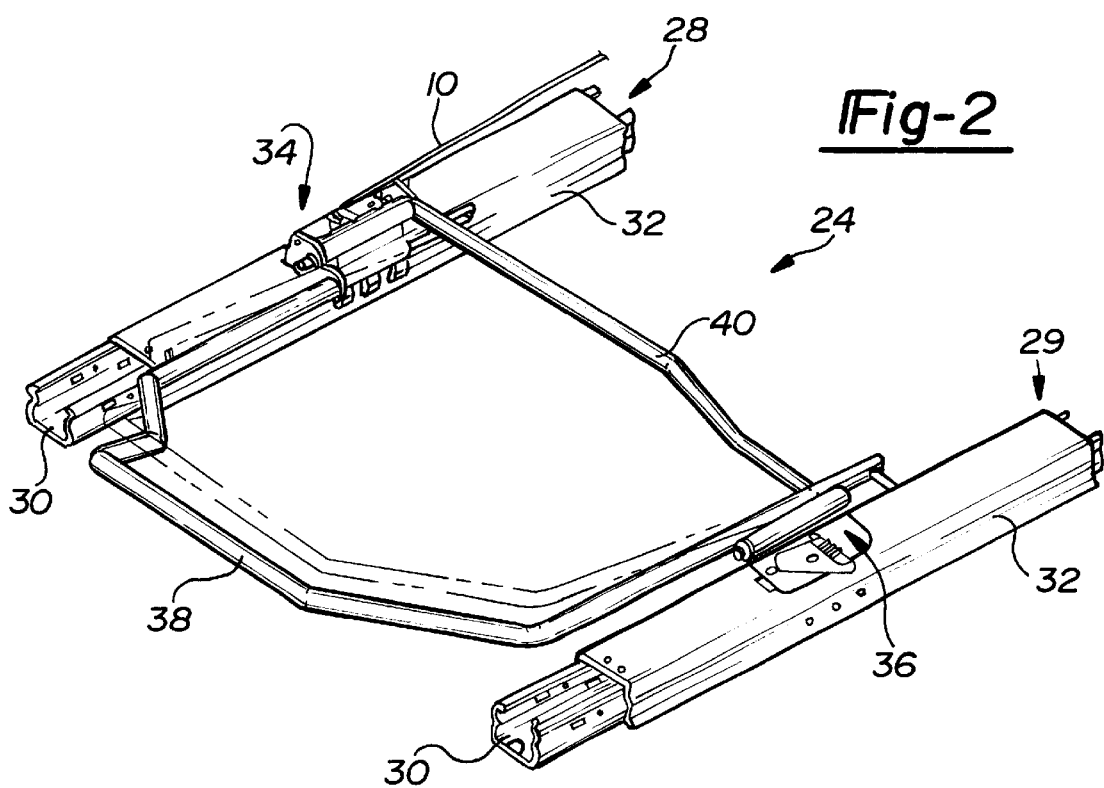
FIG. 2 is a perspective view of a preferred embodiment of a seat track assembly designed according to this invention.

The mounting assembly 24 includes track assemblies on an inboard side 28 and an outboard side 29 of the seat assembly. A handle 38, accessible by a seat occupant, is operably connected to both the inboard and outboard track assemblies. The terms inboard and outboard are used in this description for clarity and illustration purposes only and cannot be considered limiting. As shown in FIG. 2, each side of the mounting assembly 24 includes a first track 30 and a second track 32. The first track 30 is a lower track 30 that is fixedly mounted to a frame of the vehicle, for example. The second track 32 is an upper track 32 is received over the lower track 30 so that the upper track 32 can be moved in a forward or rearward direction relative to the lower track 30. The terms forward, rearward, upper, and lower, as used in this description, are for illustration purposes only and cannot be considered limiting. The profiles of the lower track 30 and the upper track 32 ensure that the upper track 32 only moves along a longitudinal axis of the tracks and does not move in other directions.

The inboard side 28 of the mounting assembly 24 includes a locking device 34 that is supported on the upper track 32. The outboard side 29 also includes a locking device 36 that is supported on the upper track 32. The handle 38 is accessible by the seat occupant from the front of the seat 20 to disengage the locking devices 34 and 36 so that the position of the seat can be adjusted. Preferably, the handle 38 only acts directly upon the locking device 34 and a connector bar or cable 40 is provided so that the locking device 36 is also actuated upon manipulation of the handle 38. Thus, the outboard locking device 36 would be similar but not identical to the inboard locking device 34. However, in an alternate embodiment the handle 38 could act upon both locking devices 34, 36 so that both locking devices 34, 36 would be substantially identical to each other.

Alternatively, the outboard locking device 36 could be a slave mechanism controlled solely by the inboard locking device 34. This would mean that the outboard locking device would be different than the inboard locking device. The reverse configuration could also be used with the inboard locking device being the slave mechanism controlled by the outboard device. It should be understood that the locking device 34 of the subject invention can be used in either embodiment, therefore the remaining portion of the description will be in reference only to the inboard locking device 34 with the understanding that the outboard locking device 36 is either of a similar design or a slave mechanism.

Figure 3:
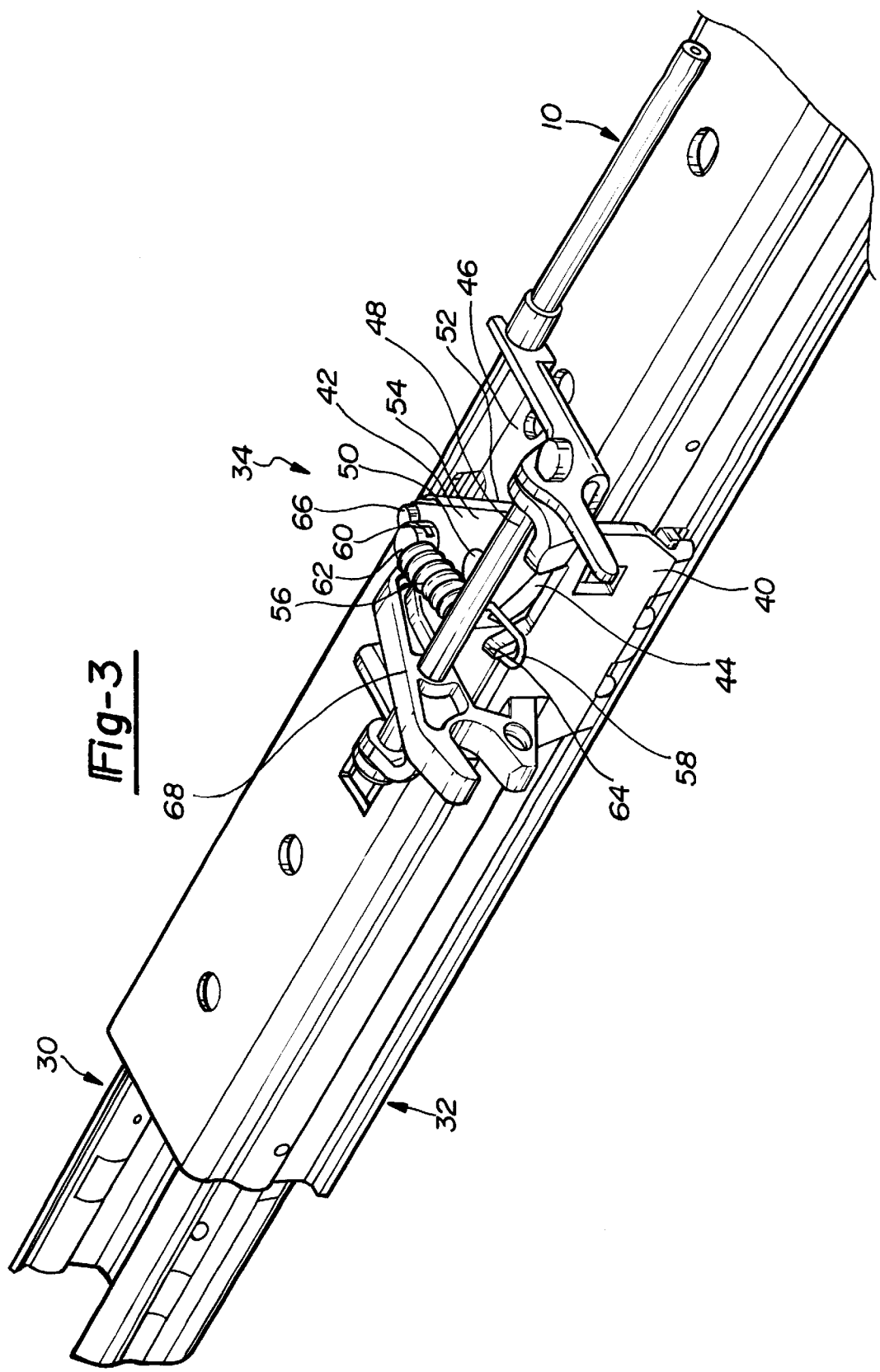
FIG. 3 is an enlarged, perspective view of the preferred embodiment of the seat track as shown in FIG. 2, in the engaged position.

The inboard side 28 of the assembly 24 is shown in a perspective view in FIG. 3. The assembly 24 moves between a locked or engaged position and an unlocked or disengaged position. The assembly 24 shown in FIG. 3 is in the engaged, locked position and the assembly 24 shown in FIG. 4 is in the disengaged, unlocked position.

Figure 4:
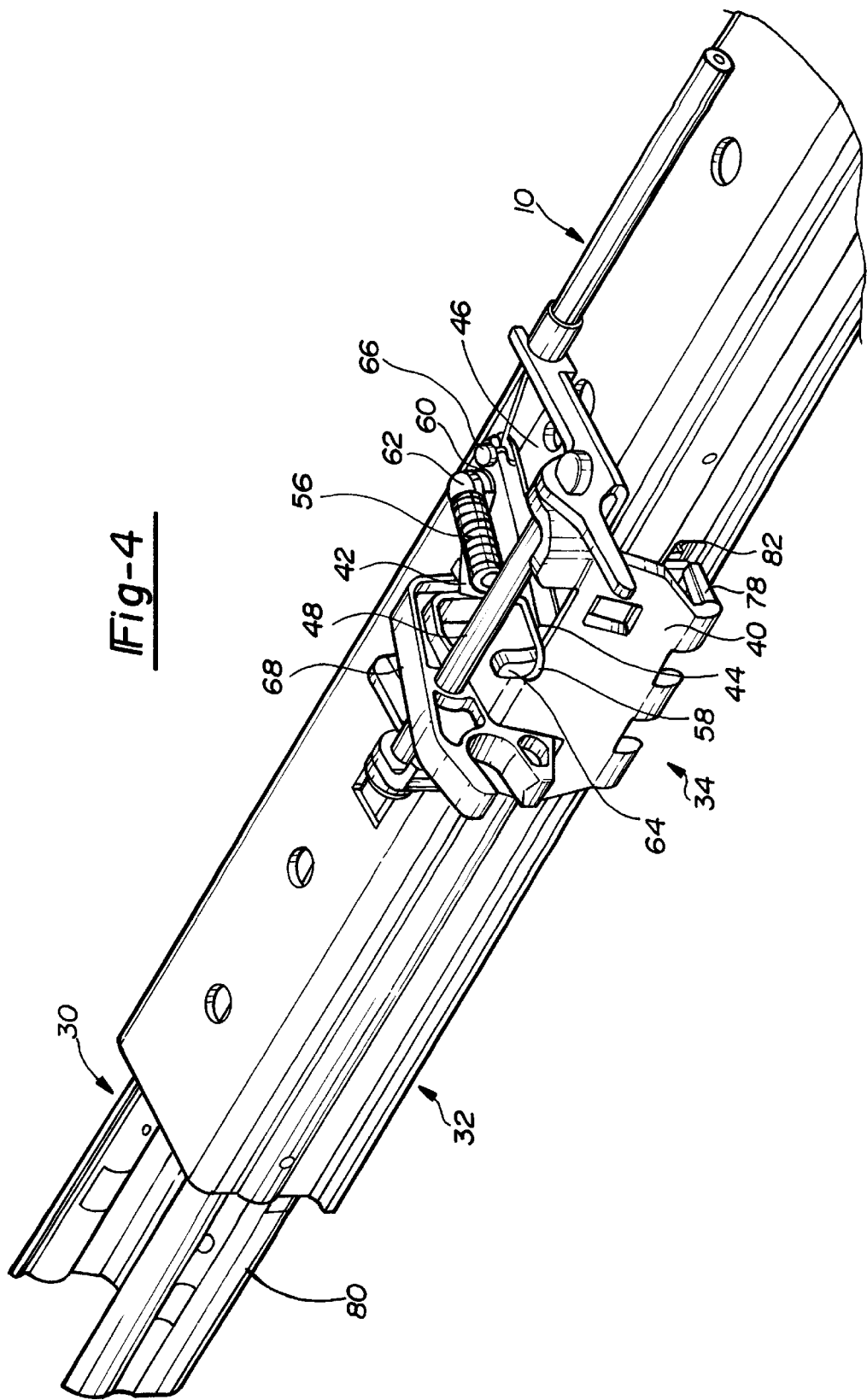
FIG. 4 is an enlarged, perspective view of the preferred embodiment of the seat track, as shown in FIG. 2, in the disengaged position.

Referring to FIGS. 3 and 4, the locking assembly 34 includes a locking device 40 supported on the upper track 32 and moveable between a locked position where the locking device 40 maintains the upper track 32 in a desired position and an unlocked position where the upper track 32 is movable relative to the first track 30. The locking assembly 34 also includes a release member 42 that selectively moves into a release position to move the locking device 40 out of the locked position and maintain the locking device in the unlocked position such that the upper track 32 can move relative to the first track 30. The release member 42 includes an engaging portion 44 that slidably engages the locking device 40 for moving the locking device 40 between the locked and unlocked positions.

A mounting bracket 46 mounts the locking device 40 and the release member 42 to the upper track 32. The locking device 40 is connected to the mounting bracket 46 with at least one pivot pin 48 such that the locking device 40 rotates with respect to the upper track 32 when the release member 42 moves the locking device 40 between the locked and unlocked positions. In the preferred embodiment a single pivot pin 48 is used to mount the locking device 40 to the mounting bracket 46, however, more than one pivot pin 48 could be used.

The release member 42 is connected to the mounting bracket 46 with another pivot pin 50 such that the release member 42 is able to rotate with respect to the upper track 32. The release member 42 includes a first surface 52 and a second surface 54. The first surface 52 slidably engages the mounting bracket 46 as the release member 42 engages the locking device 40. Thus, as the release member 42 rotates with respect to the upper track 32, there is sliding engagement between the release member 42 and the mounting bracket 46.

The locking assembly 34 includes a spring member 56 for resiliently connecting the locking device 40 and the release member 42. The spring member 56 includes a first spring end 58 connected to the locking device 40 and a second spring end 60 connected to the release member 42. The first spring end 58 is held on the locking device 40 by a tab extension 64 extending upwardly from the locking member 40. The second spring end 60 is secured to the release member 42 by a pin member 62 which extends through the release member 32 and engages the mounting bracket 46.

The control cable 10 is connected to the release member 42 for selectively moving the release member 42 into the release position. The control cable 10 is preferably operatively connected to the seat back 26 and as the seat back 26 is pivoted downwardly toward the seat bottom 22 the cable 10 is tensioned such that it pulls rearwardly on the release member 42. While the control cable 10 preferably is responsive to pivotal movement of the seat back 26 it could also be responsive to other input actuating members such as a handle, rod, or actuation button. Placing the cable 10 in tension places a force on the release member 42 and causes the release member 42 to pivot about the pivot pin 50, which causes the engaging portion 44 to slide along the locking device 40 so that it moves out of the locked position and into the unlocked position shown in FIG. 4. Thus, the release member 42 applies a lateral force against the locking device 40 as it rotates, which in turn causes the locking device 40 to rotate about pivot pin 48 to move the assembly 34 out of the locked position and into the unlocked position. As the release member 42 rotates, the spring member 56 is extended such that when the release member 42 is caused to rotate back to its original position, the spring member 56 recoils, thus assisting the return of the release member 42. Thus, a lateral force against the locking device 40 is translated into a rotation movement of the teeth 78.

The handle 38 is serves as a second release member for independently moving the locking device 40 between the locked and unlocked positions. The handle 38 is connected to the locking device 40 by a lever 68 which is rotatably supported on the pivot pin 58.

Figure 5:
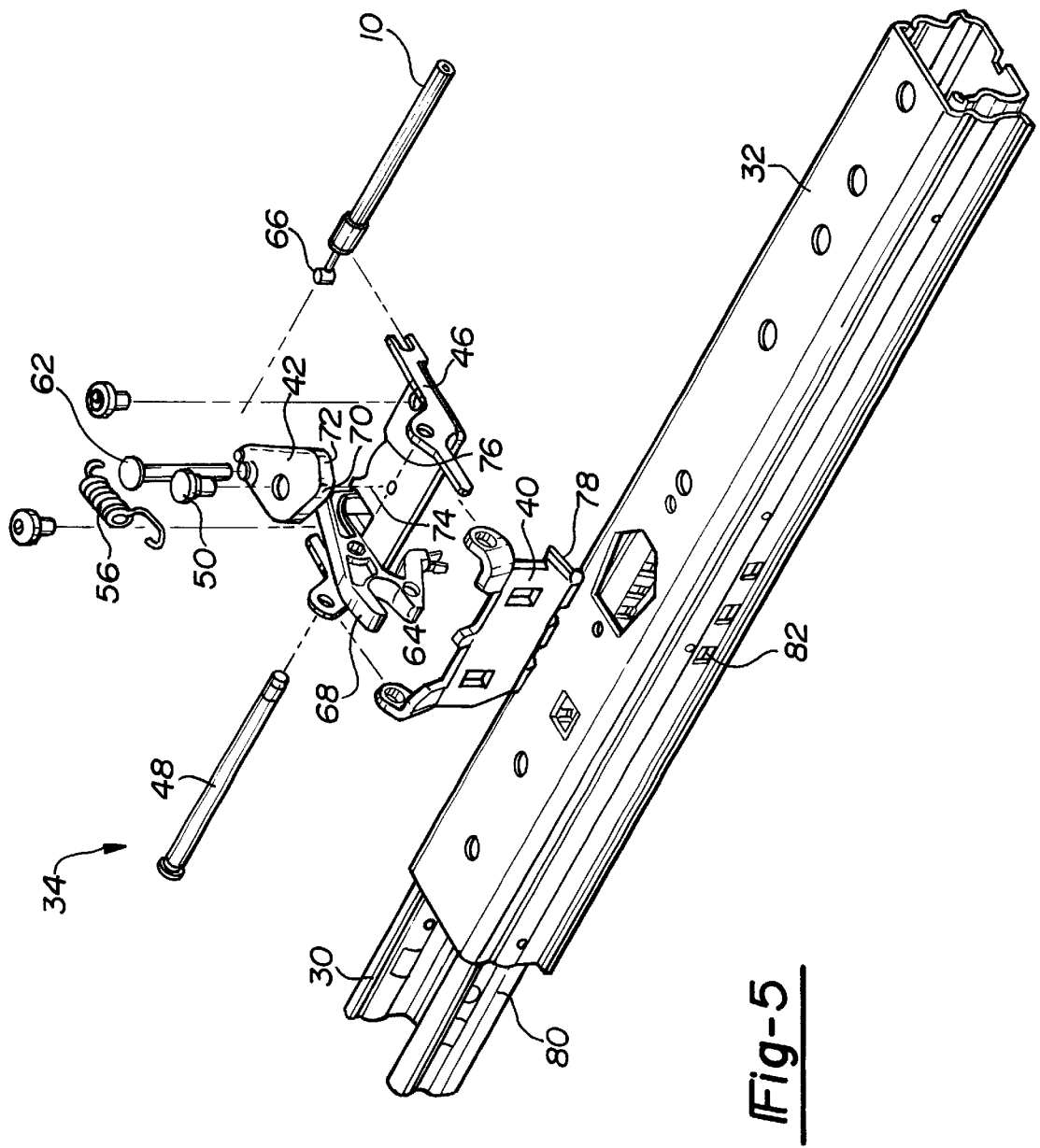
FIG. 5 is an enlarged, perspective, exploded view of the preferred embodiment of the seat track shown in FIG. 2.

An exploded view of the assembly 34 is shown in FIG. 5. The engaging portion 44 of the release member 42, preferably includes a camming lobe 70 and an edge portion 72. The camming lobe 70 slidably engages the locking device 40, causing the locking device 40 to move from the locked position to the unlocked position. Once the camming lobe 70 has slid along the surface of the locking device 40, and the assembly 34 is in the unlocked position, the edge portion 72 is engaged against the locking device 40. Thus, the edge portion 42 is in contact with the locking device 40 when the release member 32 is in the release position.

As seen in FIG. 5, the mounting bracket 46 includes a first detent 74 and a second detent 76. The pin member 62 used to connect the spring 56 to the release member 42, engages the first detent 74 when the locking device 40 is in the locked position and engages the second detent 76 when the locking device 40 is in the unlocked position. The pin member 62 slides along a curved surface interconnecting the detents 74, 76 as the release member 42 is rotated to the release position.

The pin member 62 is returned from the release position to its original position as the seat is slid rearwardly. Typically, the pin 62 hits a tab, block member, or bar in the track which forces the pin 62 to return to the first detent 74

The locking device 40 locking device includes a plurality of locking pawls or teeth 78, seen more clearly in FIG. 4, and the lower track includes a sidewall 80 having a plurality of slots 82. At least one tooth 78 is received in one of the slots 82 when the locking device 40 is in the locked position. The teeth 78 are disengaged from the slots 82 when either the handle 38 or the release member 32 moves the locking device 40 to the unlocked position.

In summary, the vehicle seat assembly 20 includes a seat back 26 pivotally supported with respect to a seat bottom 22 and is attached to the vehicle by a mounting assembly 24.

The seat assembly includes two control functions. A seat occupant can adjust the seat 20 rearwardly or forwardly to a desired location. The seat back 26 can also be pivoted downwardly toward the seat bottom 22 and the entire seat 20 can then be slid forward along the lower track 30 to facilitate entry of an occupant into a back seat of a vehicle.

The mounting assembly 24 includes a locking device 40 mounted on an upper track 32 that moves relative to a lower track 30. The locking device 40 includes at least one tooth 78 that engages one or more slots 82 on the lower track 30 so that the upper track 32 and the seat 20 are maintained in a fixed position relative to the lower track 30. The locking device 40 includes a first release member or handle 38 for disengaging the locking device 40 and adjusting the position of the seat 20. The locking device 40 also includes a second release member 42 which is responsive to pivotal movement of the seat back 26 with respect to the seat bottom 22 or is responsive to another actuation member such as a rod or handle. As the seat back 26 is pivoted toward the seat bottom 22, the release member 42 rotates with respect to the upper track 32 and engages the locking device 40 causing it to move from an locked position to an unlocked position. This causes the upper track 32 and the seat 20 to move with respect to the lower track 30, thus allowing the seat 20 to be slid forward.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An assembly for mounting a seat within a vehicle comprising, in combination:
   a first track;
   a second track supported for movement relative to said first track;
   a locking device supported on said second track and moveable between a locked position where said locking device maintains said second track in a desired position and an unlocked position wherein said second track is movable relative to said first track;
   a release member that selectively moves into a release position to move said locking device out of said locked position and maintain said locking device in said unlocked position such that said second track can move relative to said first track, wherein said release member includes an engaging portion that applies a lateral force to slidably engage said locking device to move said locking device between said locked and unlocked positions; and
   at least one spring member for resiliently connecting said locking device and said release member.

2. An assembly as recited in claim 1 including a mounting bracket for mounting said locking device and said release member to said second track.

3. An assembly as recited in claim 2 wherein said locking device is connected to said mounting bracket with at least one pivot pin such that said locking device rotates with respect to said second track when said release member moves said locking device between said locked and unlocked positions.

4. An assembly as recited in claim 2 wherein said release member is connected to said mounting bracket with a pivot pin such that said release member is able to rotate with respect to said second track.

5. An assembly as recited in claim 4 wherein said release member includes a lower surface and an upper surface, said lower surface slidably engaging said mounting bracket as said release member engages said locking device.

6. An assembly as recited in claim 4 wherein said engaging portion of said release member includes a camming lobe and an edge portion, said camming lobe for slidably engaging said locking device, causing said locking device to move from said locked position to said unlocked position, and said edge portion for engaging said locking device when said release member is in said release position.

7. An assembly as recited in claim 1 wherein said spring member includes a first spring end connected to said locking device and a second spring end connected to said release member.

8. An assembly as recited in claim 1 including a control cable connected to said release member for selectively moving said release member into said release position.

9. An assembly for mounting a seat within a vehicle comprising:
   a first track;
   a second track supported for movement relative to said first track;
   a locking device supported on said second track and moveable between a locked position where said locking device maintains said second track in a desired position and an unlocked position where said second track is movable relative to said first track;
   a release member that selectively moves into a release position to move said locking device out of said locked position and maintain said locking device in said unlocked position such that said second track can move relative to said first track wherein said release member includes an engaging portion that slidably engages said locking device for moving said locking device between said locked and unlocked positions;
   a mounting bracket for mounting said locking device and said release member to said second track; and
   at least one spring member for resiliently connecting said locking device and said release member wherein said spring member includes a first spring end connected to said locking device and a second spring end connected to said release member wherein said second spring end is secured to said release member by a pin member which extends through said release member and engages said mounting bracket.

10. An assembly as recited in claim 9 wherein said mounting bracket includes a first detent and a second detent, said pin member engaging said first detent when said locking device is in said locked position and engaging said second detent when said locking device is in said unlocked position.

11. An assembly for mounting a seat within a vehicle comprising, in combination:
    a locking device supported on said second track for rotation about a generally horizontal axis and moveable between a locked position where said locking device maintains said second track in a desired position and an unlocked position where said second track is movable relative to said first track;
    a first release member rotatable about a generally vertical axis to selectively move said locking device out of said locked position and maintains said locking device in said unlocked position such that said second track can move relative to said first track, wherein said first release member includes an engaging portion that applies a lateral force to said locking device to rotate said locking device with respect to said second track and move said locking device between said locked and unlocked positions; and a second release member for moving said locking device between said locked and unlocked positions independently of the first release member, operatively coupled to said seat back and supported on said second track, said second release member being responsive to movement of an actuation member wherein said second release member applies a lateral force to said locking device causing said locking device to move in and out of said locked position.

12. An assembly as recited in claim 11 including at least one mounting bracket for mounting said locking device and said first release member to said second track.

13. An assembly as recited in claim 12 wherein said locking device is connected to said mounting bracket with at least one pivot pin such that said locking device rotates with respect to said second track when said first release member moves said locking device between said locked and unlocked positions.

14. An assembly as recited in claim 12 wherein said release member is connected to said mounting bracket with a pivot pin such that said release member is able to rotate with respect to said second track about said pivot pin.

15. An assembly as recited in claim 11 including a spring member for resiliently connecting said locking device and said release member.

16. An assembly for mounting a seat within a vehicle comprising:

a first track;

a second track supported for movement relative to said first track;

a locking device supported on said second track and moveable between a locked position where said locking device maintains said second track in a desired position and an unlocked position where said second track is movable relative to said first track;

a first release member that to selectively moves said locking device out of said locked position and maintains said locking device in said unlocked position such that said second track can move relative to said first rack wherein said first release member includes an engaging portion that applies a lateral force to said locking device to rotate said locking device with respect to said second track and move said locking device between said locked and unlocked positions;

at least one mounting bracket for mounting said locking device and said first release member to said second track;

at least one pivot pin connecting said locking device to said mounting bracket such that said locking device rotates with respect to said second track when said first release member moves said locking device between said locked and unlocked positions; and a second release member for independently moving said locking device between said locked and unlocked positions wherein said second release member is connected to said locking device by a lever which is rotatably supported on said pivot pin.

17. A vehicle seat assembly comprising, in combination:

a seat bottom;

a seat back pivotally supported for pivotal movement relative to said seat bottom;

a first track;

a second track supported for movement relative to said first track, said seat bottom being supported on said second track for movement with said second track;

a locking device supported on said second track for movement into and out of a locked position where said locking device maintains said second track in a selected position relative to said first track;

a first release member supported on said second track for selectively moving said locking device into and out of said locked position; and a second release member for moving said locking device between said locked and unlocked positions independently of the first release member, operatively coupled to said seat back and supported on said second track, said second release member being responsive to movement of an actuation member wherein said second release member applies a lateral force to said locking device causing said locking device to move in and out of said locked position.

18. A seat assembly as recited in claim 17 wherein said second release member is pivotally mounted to said second track such that said second release member rotates with respect to said second track and slidably engages said locking device to move said locking device to an unlocked position when said seat back is pivoted from an upright position to a lowered position resulting in said second track moving with respect to said first track.

19. A seat assembly as recited in claim 18 wherein said locking device includes at least one locking tooth and said first track includes a sidewall having a plurality of slots with at least one locking tooth being received in one of said slots when said locking device is in said locked position and said locking tooth being disengaged from said slots when said second release member moves said locking device to said unlocked position.

* * * * *